United States Patent
Shen et al.

(10) Patent No.: US 12,442,690 B2
(45) Date of Patent: Oct. 14, 2025

(54) SYSTEMS AND METHODS FOR PEOPLE COUNTING USING BEAM-FORMING PASSIVE INFRARED SENSORS HAVING A DYNAMICALLY CONFIGURABLE FIELD OF VIEW

(71) Applicant: SIGNIFY HOLDING B.V., Eindhoven (NL)

(72) Inventors: Eric Bertrand Shen, Bedford, MA (US); Jin Yu, Lexington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 464 days.

(21) Appl. No.: 18/010,845

(22) PCT Filed: Jul. 1, 2021

(86) PCT No.: PCT/EP2021/068181
§ 371 (c)(1),
(2) Date: Dec. 16, 2022

(87) PCT Pub. No.: WO2022/008340
PCT Pub. Date: Jan. 13, 2022

(65) Prior Publication Data
US 2023/0228624 A1    Jul. 20, 2023

Related U.S. Application Data

(60) Provisional application No. 63/050,376, filed on Jul. 10, 2020.

(30) Foreign Application Priority Data

Jul. 17, 2020    (EP) .................................... 20186429

(51) Int. Cl.
G01J 5/0806    (2022.01)
G01J 5/00      (2022.01)
(Continued)

(52) U.S. Cl.
CPC .......... *G01J 5/0025* (2013.01); *G01J 5/0806* (2013.01); *G01J 5/34* (2013.01); *G02F 1/29* (2013.01);
(Continued)

(58) Field of Classification Search
CPC .......... G01J 5/0025; G01J 5/0806; G01J 5/34; H05B 47/13; G02F 1/29; G02F 2203/11; G02F 2203/28
See application file for complete search history.

(56) References Cited

U.S. PATENT DOCUMENTS 10,018,510 B2 *  7/2018  Schilz ................... G01J 5/0025
10,209,124 B2    2/2019  Monaci et al.
(Continued)

FOREIGN PATENT DOCUMENTS

EP    1120763 A1    8/2001
EP    3624077 A1    3/2020
(Continued)

*Primary Examiner* — David P Porta
*Assistant Examiner* — Fani Polyzos Boosalis

(57) ABSTRACT

A detection system (10) and a detection method (2000) are disclosed herein. The system includes a PIR sensor (12) positioned in an area comprising a plurality of sub-areas, the motion sensor comprising an optical device (22) having a plurality of sub-lenses (26, 28, 30), each sub-lens of the plurality of sub-lenses having a field of view (FOV) corresponding to a sub-area of the plurality of sub-areas. The system further includes at least one processor (32) coupled to the PIR sensor and configured to: activate the plurality of sub-lenses to generate a total sensor FOV comprising each FOV of the plurality of sub-lenses; and dynamically control the plurality of sub-lenses to subdivide the total sensor FOV, wherein the subdivided sensor FOV is smaller than the total sensor FOV.

13 Claims, 15 Drawing Sheets

(51) Int. Cl.
*G01J 5/34* (2022.01)
*G02F 1/29* (2006.01)
*H05B 47/13* (2020.01)

(52) U.S. Cl.
CPC .......... *H05B 47/13* (2020.01); *G02F 2203/11* (2013.01); *G02F 2203/28* (2013.01)

(56) References Cited

U.S. PATENT DOCUMENTS

| | | |
|---|---|---|
| 2007/0023662 A1 | 2/2007 | Brady et al. |
| 2009/0219388 A1 | 9/2009 | Zisa et al. |
| 2014/0319349 A1 | 10/2014 | Horie et al. |
| 2017/0205289 A1 | 7/2017 | Purohit et al. |
| 2017/0254703 A1 | 9/2017 | Purohit et al. |
| 2017/0293198 A1 | 10/2017 | Kim et al. |
| 2022/0217829 A1* | 7/2022 | Hiremath .................. G01J 5/34 |

FOREIGN PATENT DOCUMENTS

| | | |
|---|---|---|
| GB | 2122339 A | 1/1984 |
| WO | 2007024344 A2 | 3/2007 |

\* cited by examiner

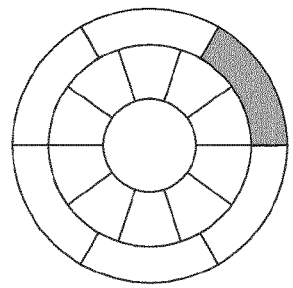
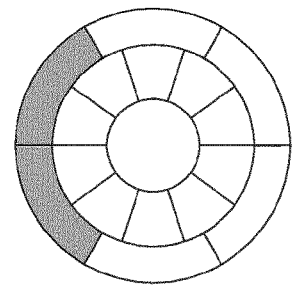
Fig. 15   Fig. 16
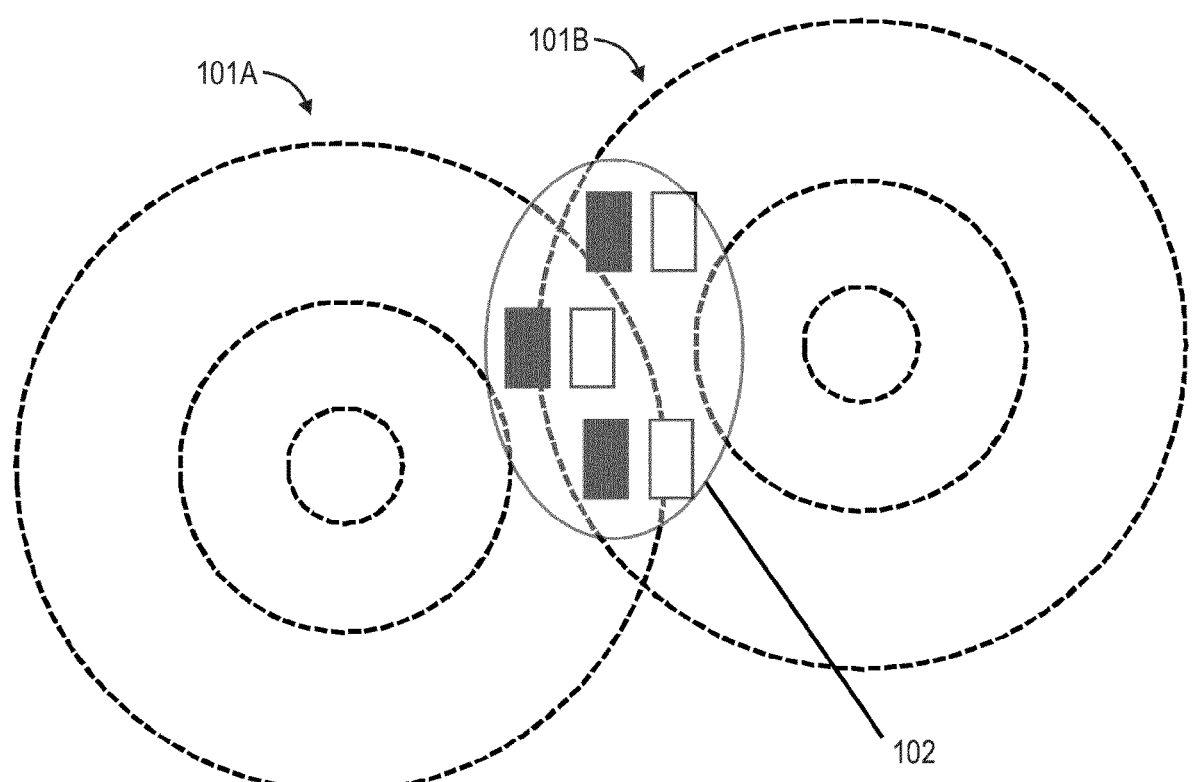
Fig. 17

SYSTEMS AND METHODS FOR PEOPLE COUNTING USING BEAM-FORMING PASSIVE INFRARED SENSORS HAVING A DYNAMICALLY CONFIGURABLE FIELD OF VIEW

CROSS-REFERENCE TO PRIOR APPLICATIONS

This application is the U.S. National Phase application under 35 U.S.C. § 371 of International Application No. PCT/EP2021/068181, filed on Jul. 1, 2021, which claims the benefit of European Patent Application No. 20186429.5, filed on Jul. 17, 2020, and U.S. Provisional Patent Application Ser. No. 63/050,376, filed on Jul. 10, 2020. These applications are hereby incorporated by reference herein.

FIELD OF THE DISCLOSURE

The present disclosure is directed generally to systems and methods using beam-forming passive infrared sensors for determining how many occupants are in a location and/or localizing the positions of the occupants in the location.

BACKGROUND

Automating building functions (e.g., heating, ventilation, and air conditioning, or HVAC systems, lighting systems, etc.) can be used to both optimize occupant comfort and minimize energy usage, and therefore cost, of maintaining a building. For example, passive infrared (PIR) sensors are a cost-efficient solution ubiquitous in building lighting control systems to control when lighting fixtures are turned on when areas are occupied. PIR sensors sense motion by detecting a differential in IR radiation between at least two sensing elements. A lens, typically a Fresnel lens, is used to focus IR radiation on the sensing elements and determines the field of view (FOV) of the sensor. To minimize costs for an installation, the FOV is usually set as wide as possible (e.g., 90 degrees or greater) for the detection area to be as large as possible. By detecting motion in combination with hold times after motion detection, a packaged PIR sensor for lighting control attempts to discriminate between presence and vacancy states for an area within the FOV of the sensor. However, such motion detection is not granular thus, while motion can be detected it cannot be determined how many people are causing the motion or where the people are located.

Typically, altering the FOV of a PIR sensor can be done mechanically, but such alterations cannot be made easily since they require manual intervention. Others have attempted to use PIR sensors for detecting, locating, and tracking an individual using movement analysis. However, such efforts require as many pyroelectric components as optical beams, image analysis, or using multiple PIR sensors focused on the same area, where the FOV is modulated and coded using physical masks. Unfortunately, increasing the number of pyroelectric components and using image analysis is cost prohibitive. Additionally, using multiple PIR sensors to cover a single area compromises the accuracy of detecting presence/vacancy and motion events due to double counting when a single person or motion is detected by multiple sensors. The presence/vacancy detection of conventional PIR sensors for lighting control may also not be accurate when using a single PIR sensor to cover an area which leads to false-on or false-off triggers.

Accordingly, there is a need in the art for systems and methods using beam-forming passive infrared sensors to enable the accurate determination of a number of occupants in a location and/or localization of the positions of the occupants in the location.

SUMMARY OF THE INVENTION

The present disclosure is directed to inventive systems and methods using beam-forming passive infrared sensors to determine how many occupants are in a location and/or localize the positions of the occupants in the location, which can be particularly useful for operating a control system in the location or for providing data for other applications. In particular, embodiments of the present disclosure are directed to improved systems and methods for dynamically focusing the FOV of a PIR sensor on different positions within an area enabling targeted presence/vacancy determination and people counting. The improved systems and methods described herein do not require multiple sensors focused on a single area or a separate physical mask that can be programmed to change the direction of detection. Various embodiments and implementations herein are directed to a beam-forming PIR sensor that uses a Fresnel lens with an electrochromic photothermal material to enable dynamic configuration of the sensor FOV without using a separate physical device.

Generally, in one aspect, a detection method is provided. The detection method includes the step of providing a first motion sensor in an area having a plurality of sub-areas, wherein the first motion sensor includes an optical element having a plurality of sub-lenses, each sub-lens of the plurality of sub-lenses having a field of view (FOV) corresponding to a sub-area of the plurality of sub-areas. The detection method further includes the steps of activating the plurality of sub-lenses to generate a total sensor FOV including each FOV of the sub-lenses, receiving at the plurality of sub-lenses, infrared energy emitted by an individual or an object present in the area, focusing by the plurality of sub-lenses, the received infrared energy onto at least two sensing elements including a pyroelectric element, and dynamically controlling the plurality of sub-lenses to subdivide the total sensor FOV, wherein the subdivided sensor FOV is smaller than the total sensor FOV.

In embodiments, the step of controlling the plurality of sub-lenses further includes activating or deactivating at least one sub-lens to generate the subdivided sensor FOV.

In embodiments, at least one sub-lens of the plurality of sub-lenses includes an electrochromic photothermal material.

In embodiments, the subdivided sensor FOV is smaller than 90 degrees or smaller than 45 degrees.

In embodiments, the method further includes the steps of providing a second motion sensor in the area, wherein the second motion sensor is adjacent to the first motion sensor, obtaining positions of the first and second motion sensors in the area during a commissioning process, and determining a relative coverage of the first and second motion sensors.

In embodiments, the method further includes the step of controlling the pluralities of sub-lenses in the first and second motion sensors such that a least one sub-lens from each of the first and second motion sensors is configured to be activated to form a combined detection area.

In embodiments, the method further includes the steps of determining an overlapped area between the first and second motion sensors and controlling the pluralities of sub-lenses in the first and second motion sensors such that a least one sub-lens from each of the first and second motion sensors is configured to be activated to form a combined detection area.

In embodiments, the method further includes the steps of generating sensor information indicating motion or presence in the subdivided sensor FOV and controlling a lighting system based on the generated sensor information.

In embodiments, the method further includes the step of controlling the plurality of sub-lenses to further subdivide the subdivided sensor FOV, wherein the additionally subdivided sensor FOV comprises a different set of activated sub-lenses. In embodiments, the method further includes the step of generating sensor information indicating motion or presence in the subdivided sensor FOV and/or the additionally subdivided sensor FOV and time multiplexing the generated sensor information to facilitate control of a lighting system based on the generated sensor information.

Generally, in another aspect, a detection system is provided. The detection system includes a first motion sensor positioned in an area comprising a plurality of sub-areas, the first motion sensor including an optical device having a plurality of sub-lenses, each sub-lens of the plurality of sub-lenses having a field of view (FOV) corresponding to a sub-area of the plurality of sub-areas, wherein the plurality of sub-lenses are configured to receive infrared energy emitted by an individual or an object present in the area and focus the received infrared energy onto at least two sensing elements configured to generate a differential signal. The detection system further includes at least one processor coupled to the first motion sensor and configured to activate the plurality of sub-lenses to generate a total sensor FOV comprising each FOV of the plurality of sub-lenses and dynamically control the plurality of sub-lenses to subdivide the total sensor FOV, wherein the subdivided sensor FOV is smaller than the total sensor FOV.

In embodiments, the at least one processor of the detection system is configured to activate or deactivate at least one sub-lens to generate the subdivided total sensor FOV.

In embodiments, at least one sub-lens of the plurality of sub-lenses includes an electrochromic photothermal material.

In embodiments, the detection system further includes a second motion sensor arranged in the area adjacent to the first motion sensor and wherein at least one sub-lens from each of the first and second motion sensors is configured to be activated to form a combined detection area including at least portions of sub-areas within the total sensor FOVs of the first and second motion sensors.

In various implementations, the inventive systems and methods involve motion sensing devices configured as sensor nodes in a wireless sensing network. The sensing devices may operate in a communication network, such as a conventional wireless network, and/or a sensor-specific network through which sensors may communicate with one another and/or with dedicated other devices. In some configurations, one or more sensors may provide information to one or more other sensors, to a central controller or server, or to any other device capable of communicating on a network with one or more sensors. A central controller may be located locally with respect to the sensors with which is communicates and from which it obtains sensor data. Alternatively or additionally, a central controller maybe remote from the sensors, such as where the central controller is implemented as a cloud-based system that communicates with multiple sensors which may be located at multiple locations and may be local or remote with respect to one another.

The processor described herein may take any suitable form, such as, one or more processors or microcontrollers, circuitry, one or more controllers, a field programmable gate array (FGPA), or an application-specific integrated circuit (ASIC) configured to execute software instructions. Memory associated with the processor may take any suitable form or forms, including a volatile memory, such as random-access memory (RAM), static random-access memory (SRAM), or dynamic random-access memory (DRAM), or non-volatile memory such as read only memory (ROM), flash memory, a hard disk drive (HDD), a solid-state drive (SSD), or other non-transitory machine-readable storage media. The term "non-transitory" means excluding transitory signals but does not further limit the forms of possible storage. In some implementations, the storage media may be encoded with one or more programs that, when executed on one or more processors and/or controllers, perform at least some of the functions discussed herein. It will be apparent that, in embodiments where the processor implements one or more of the functions described herein in hardware, the software described as corresponding to such functionality in other embodiments may be omitted. Various storage media may be fixed within a processor or may be transportable, such that the one or more programs stored thereon can be loaded into the processor so as to implement various aspects as discussed herein. Data and software, such as the algorithms or software necessary to analyze the data collected by the tags and sensors, an operating system, firmware, or other application, may be installed in the memory.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the present disclosure.

FIG. 15 shows a single activated sub-lens of an example motion sensor configured to achieve a subdivided FOV according to aspects of the present disclosure;

FIG. 16 shows two activated sub-lenses of an example motion sensor configured to achieve another subdivided FOV according to aspects of the present disclosure;

FIG. 17 shows a detection zone formed from active beams generated from the motion sensor of FIG. 15 and the motion sensor of FIG. 16 according to aspects of the present disclosure;

DETAILED DESCRIPTION OF EMBODIMENTS

The present disclosure describes various embodiments of systems and methods for using beam-forming passive infrared sensors to determine how many occupants are in a location and/or localize the positions of the occupants in the location, which can be particularly useful for operating a control system in the location or for providing data for other applications. Applicant has recognized and appreciated that it would be beneficial to use a PIR sensor to provide presence detection with finer spatial granularity. Accordingly, Applicant has provided improved systems and methods using a single PIR sensor by itself or within a network to provide dynamically configurable FOVs to facilitate people counting and/or localization. Exemplary goals of utilization of certain embodiments of the present disclosure are to provide different static FOVs enabled through remote control, for example, to fine tune sensor FOVs for commissioning purposes or in response to changing office layouts, eliminating the need to manually reconfigure or move or reinstall sensors. Additional goals of utilization of certain embodiments of the present disclosure are to provide motion counts, or presence in various sub-areas to increase the spatial granularity of sensor information, via a single sensor, to count people more accurately or enable finer zonal control of a lighting system. Further goals of utilization of certain embodiments of the present disclosure are to provide the exact positions of people or objects with collaborative beamforming which can help improve the accuracy and reduce the problem of overlapping between the sensors in a network.

Figure 1A:
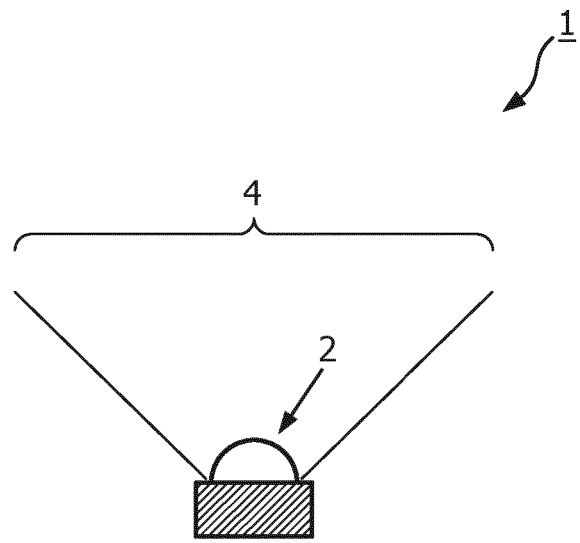
FIG. 1A is a schematic depiction of a side view of a typical passive infrared (PIR) sensor.
Figure 1B:
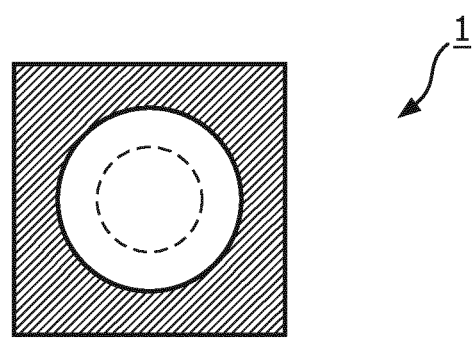
FIG. 1B is a schematic depiction of a top view of the PIR sensor shown in FIG. 1A.

Referring to FIGS. 1A and 1B, schematic depictions of side and top views of a passive infrared (PIR) sensor 1 are depicted, respectively. The PIR sensor 1 includes a lens 2 that encompasses two or more pyroelectric cells or elements that are connected in a differential way such that they remove the direct component of a heat signal and generate an output signal (e.g., a differential signal) that represents the difference of the output of all of the cell elements. The lens 2 is typically a Fresnel lens configured to increase a FOV of the sensor by focusing IR radiation on the sensing elements. A typical total sensor FOV is 90 degrees as shown in FIG. 1A using reference number 4. A total sensor FOV can also be larger. As such, the sensor 1 is configured to detect a large FOV in order to detect presence via motions in this singular large FOV. The FOV can be dynamically adjusted as described herein without mechanically or optically occluding the sensing elements.

Figure 2:
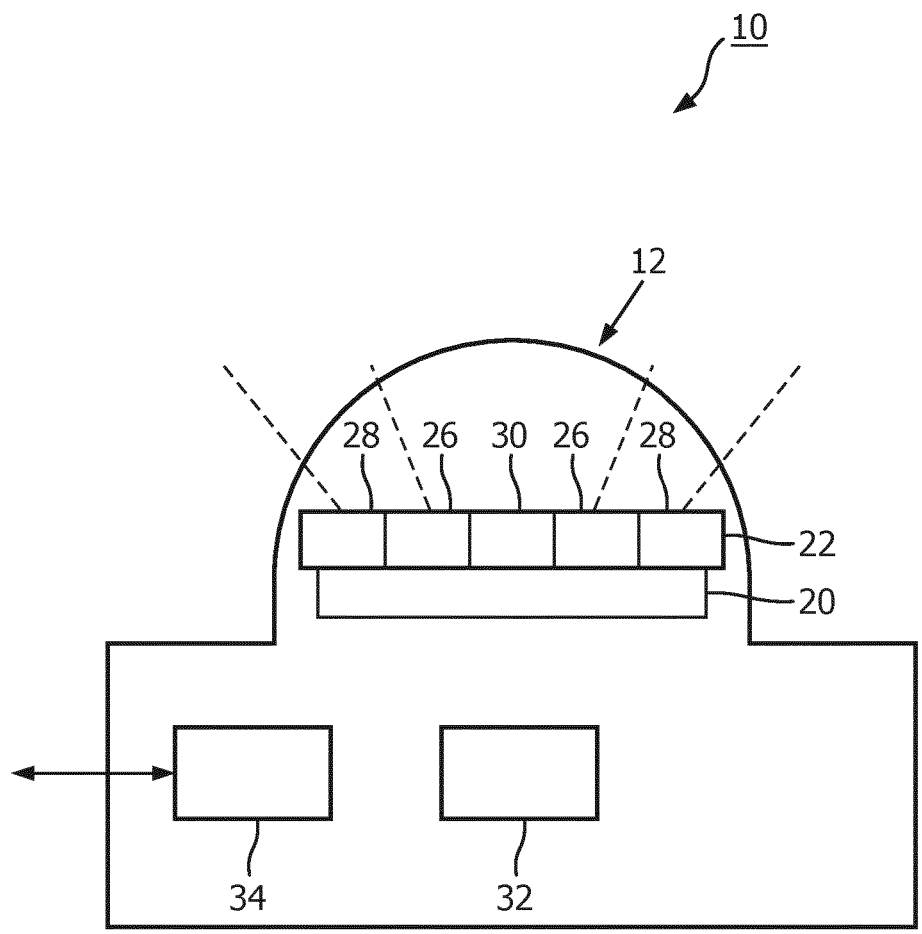
FIG. 2 is an example detection system including a PIR sensor according to aspects of the present disclosure.

FIG. 2 shows an example detection system 10 including a PIR sensor in accordance with aspects of the present disclosure. The system 10 includes a sensor 12 having a sensing unit 20 which includes the two or more pyroelectric cells or elements referenced above. In example embodiments, the sensing unit includes four sensor elements (e.g., two positive and two negative). In other example embodiments, the sensing unit can include a single element. In front of the sensing unit 20, there is an optical element 22 which includes one or more activatable lenses. While the sensor in FIG. 2 includes the optical element 22 within a lens structure, other embodiments could include the optical element 22 as part of the lens structure or attached to the inside or outside surfaces of the lens structure. For example, the optical element 22 can be a Fresnel lens arranged to direct radiation or light from a multitude of angles onto the sensing unit 20. Although FIG. 2 shows an aperture angle of less than 90 degrees, it practice, the FOV may be larger than 90 degrees or 180 degrees or larger. The sensing unit 20 and the optical element 22 define a maximum sensor coverage area or a total sensor FOV, which is the area around the sensor 10 that is "visible" to the sensing unit 20 through the optical element 22. Although FIG. 2 shows the optical element 22 in a flat configuration, it should be appreciated that optical element 22 can be arranged in any suitable configuration, for example, a quadrilateral shape (e.g., a rectangle) or a dome shape mirroring the shape of the sensor.

FIG. 2 shows a side view of the optical element 22 including a plurality of sub-lenses 26, 28, and 30 which are configured to be activated or deactivated to subdivide the total sensor FOV. The sub-lenses of the optical element 22 are made of an electrochromic photothermal material where the individual sub-lenses can be turned on or off via an electrical control signal. The electrochromic material may be a glass or a coating that is both electrochromic (e.g., optical properties activated by an electrical signal) and photothermal (e.g., capable of blocking or attenuating IR radiation).

In embodiments, the detection system 10 includes at least one processor 32 for controlling the activation and deactivation of the sub-lenses 26, 28, and 30. The at least one processor 32 can include a processing unit and a memory or a microprocessor. Additionally, the system 10 includes wireless communication means 34 in the form of a wireless communication interface. In embodiments, the wireless communication interface is adapted to operate according to the ZigBee standard. However, any suitable interface is contemplated. The at least one processor 32 controls the wireless communication means 34.

In the embodiment shown in FIG. 2, sub-lens 30 is arranged in a center of the optical element 22, sub-lenses 26 are arranged around sub-lens 30, and sub-lenses 28 are arranged around sub-lenses 26 yet any suitable configuration is contemplated. For example, the sub-lenses can be arranged in an oval shape or any other suitable shape. When the sub-lenses are deactivated, they are in an opaque state blocking light from reaching the sensing unit 20. When the sub-lenses are activated, they are in a transparent state allowing light to pass through to reach the sensing unit 20. When all of the sub-lenses are activated and therefore in a transparent state, the FOV of the sensing unit 20 is equivalent to the maximum sensor coverage area, or a total sensor FOV. When a portion of the sub-lenses is deactivated and therefore in an opaque state, the total sensor FOV is subdivided, narrowed, or targeted as further explained below.

Figure 3A:
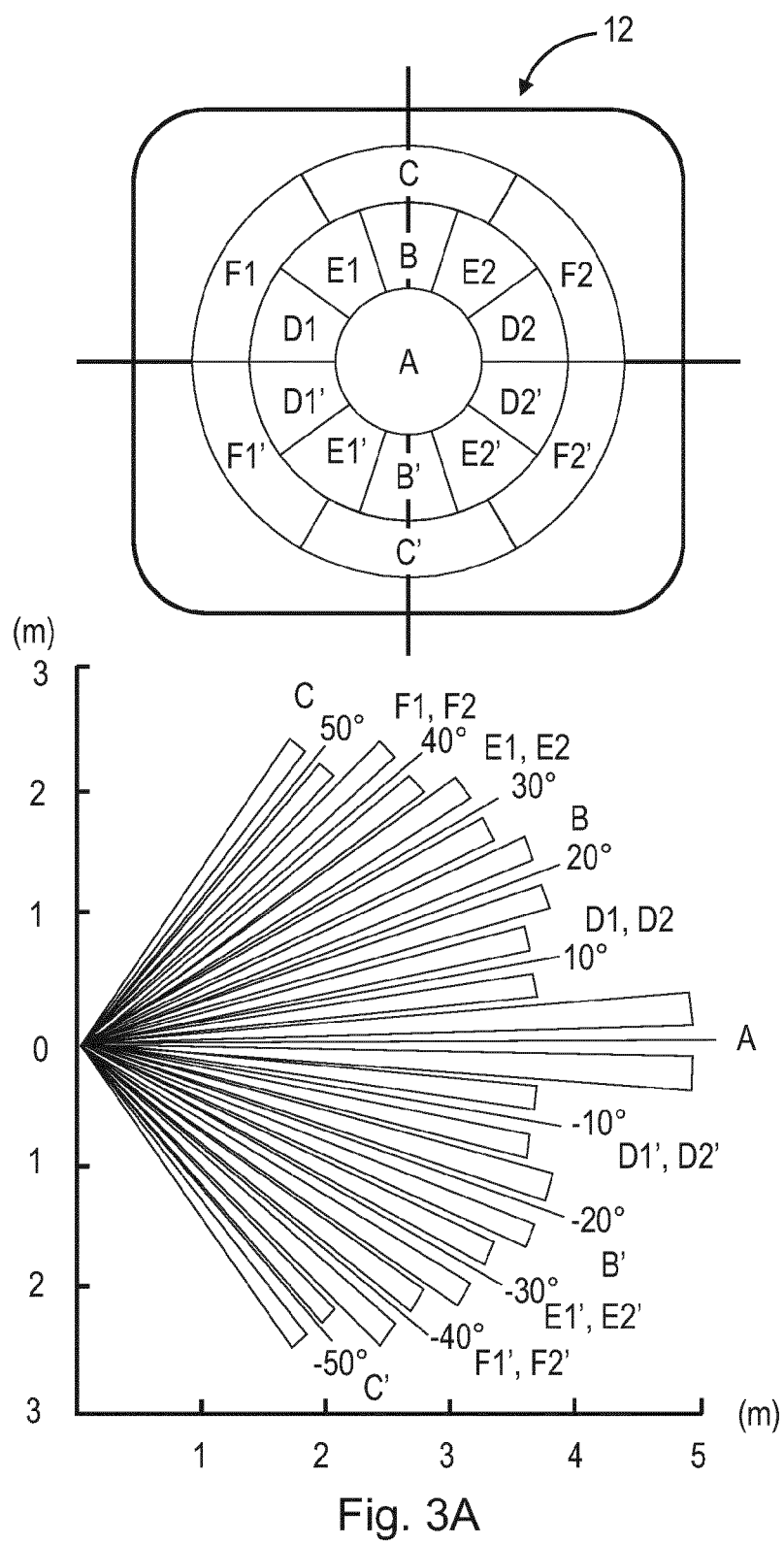
FIG. 3A is a Fresnel lens and its corresponding FOV according to aspects of the present disclosure.
Figure 3B:
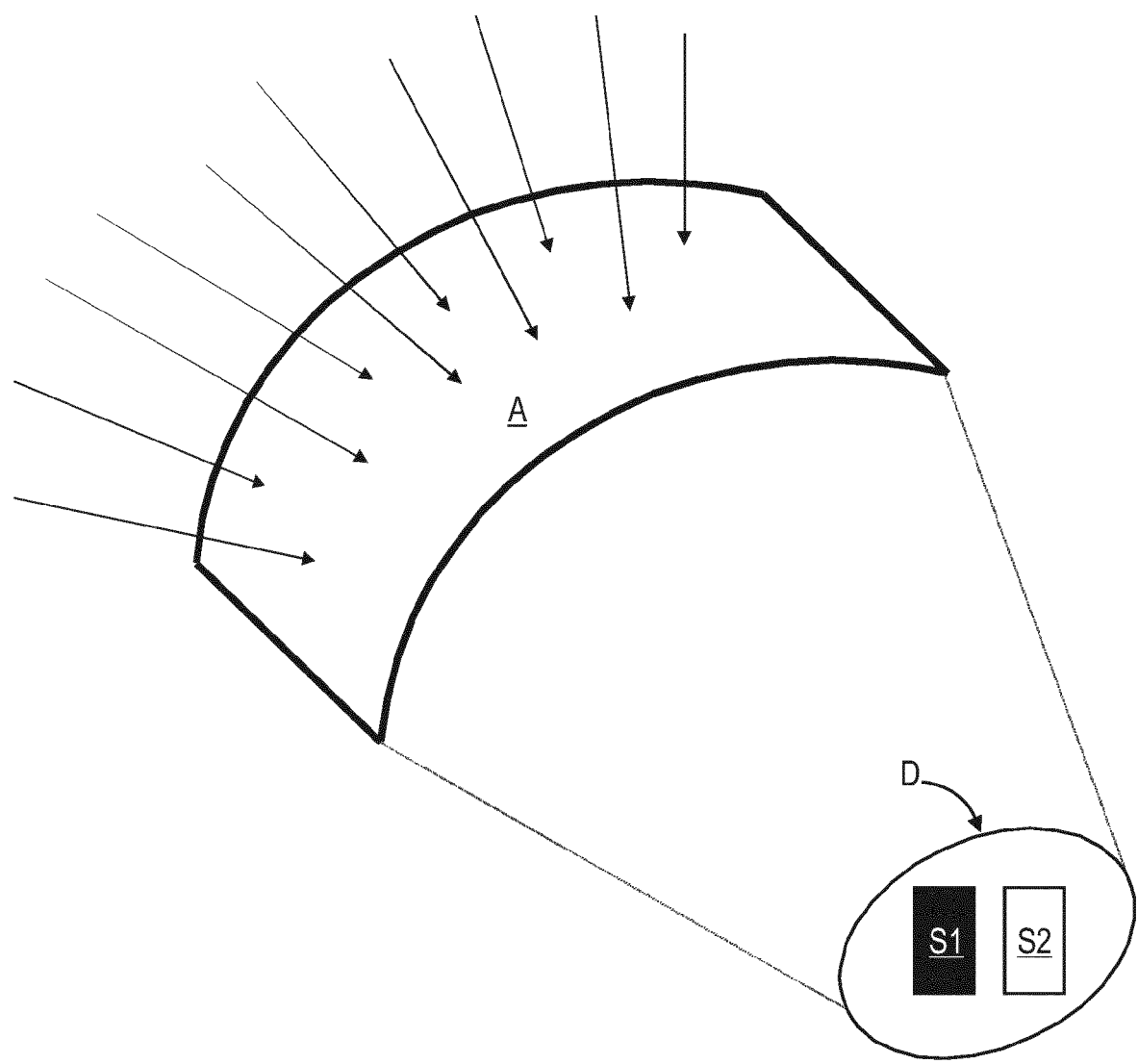
FIG. 3B is an example lens facet focusing infrared radiation onto sensing elements according to aspects of the present disclosure.

Referring to FIG. 3A, a Fresnel lens and its corresponding FOV is depicted. A top view of sensor 12 is shown on the top of FIG. 3A including a Fresnel lens having a plurality of sub-lenses. Sub-lens A in FIG. 3A corresponds to sub-lens 30 discussed above with reference to FIG. 2. Similarly, sub-lenses B, B', E1, E1', E2, E2', D1, D1', D2, and D2' shown surrounding sub-lens A correspond to sub-lenses 26 discussed above with reference to FIG. 2. Sub-lenses C, C', F1, F1', F2 and F2' shown surrounding sub-lenses B, B', E1, E1', E2, E2', D1, D1', D2, and D2' correspond to sub-lenses 28 discussed above with reference to FIG. 2. Each sub-lens is also known as a facet which can activated and deactivated as described herein and each facet focuses a beam of infrared radiation onto two or more sensing elements. The corresponding FOV of the Fresnel lens is depicted on the bottom of FIG. 3A. As one can appreciate, each lens corresponds to a portion of the total sensor coverage area. As shown in FIG. 3B, a single sub-lens (e.g., sub-lens A in FIG. 3A) focuses infrared radiation onto at least two sensor elements S1 and S2 which can be paired as a positive and a negative. Each sub-lens when activated generates a detection area D of a single beam of two rectangles. Although the focused radiation may take the shape of an oval, for example, the detected radiation is only the radiation that falls onto the sensing elements (represented as rectangles). Therefore, the resulting detection area for a single sub-lens is two rectangles that represent the projected area of radiation that falls onto the two sensor elements.

It should be appreciated that any sub-lens by itself can be activated or any combination of sub-lenses can be activated in any configuration. In example embodiments, one or more sub-lenses can be activated in a regular geometry with respect to longitudinal and lateral axes of the sensor when viewed from the top. In other embodiments, one or more sub-lenses can be activated in an irregular geometry with respect to longitudinal and lateral axes of the sensor when viewed from the top. The total sensor FOV of a sensor having the sub-lenses described herein can have a subdivided, narrowed, or targeted FOV based on the shape of the sub-lenses, the number and configuration of the sub-lenses, and the number and placement of the sensing elements. In other words, the shape of the lenses, the number and configuration of the lenses, and the number and placement of the sensing elements determine the FOV of the sensor.

Figure 4:
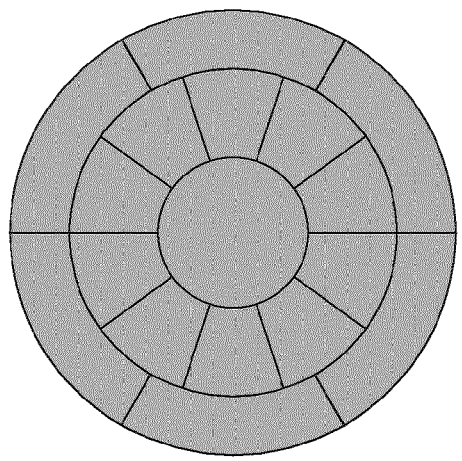
FIG. 4 shows a plurality of activatable sub-lenses of a motion sensor configured to achieve a wide FOV according to aspects of the present disclosure.
Figure 5:
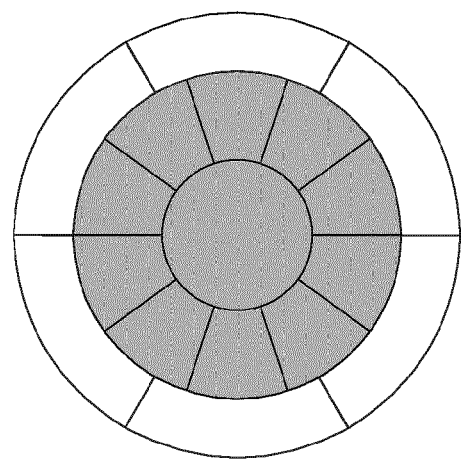
FIG. 5 shows a plurality of activatable sub-lenses of a motion sensor configured to achieve a medium FOV according to aspects of the present disclosure.
Figure 6:
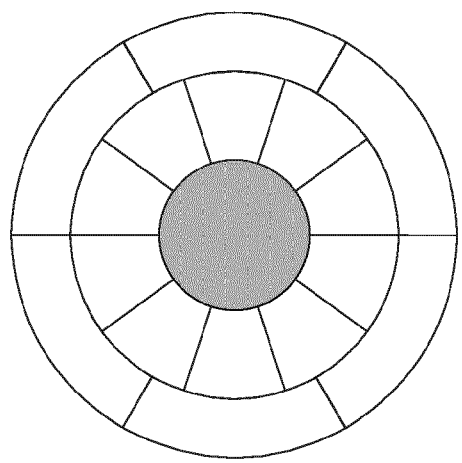
FIGS. 6 and 7 show an activatable sub-lens of a motion sensor configured to achieve a narrow FOV according to aspects of the present disclosure.

FIGS. 4, 5, and 6 show, respectively, wide, medium, and narrow FOVs according to aspects of the present disclosure. In FIG. 4, all of the sub-lenses are activated; thus, the FOV is equivalent to the maximum sensor coverage area or a maximum total sensor FOV. In FIG. 5, some of the sub-lenses are activated and some of the sub-lenses are deactivated; thus, the FOV is less than the maximum sensor coverage area or the maximum total sensor FOV in FIG. 4. Specifically, in addition to sub-lens A, sub-lenses B, B', D1, D1', D2, D2', E1, E1', E2, and E2' are also activated while the remaining sub-lenses in the outermost ring are not activated. In FIG. 6, only a single sub-lens is activated (e.g., sub-lens A in FIG. 3A) while the remaining sub-lenses are deactivated; thus, the FOV is further decreased or subdivided, narrowed, or targeted. The targeted FOV shown in FIG. 6 is advantageous if a person or an object is detected directly underneath the PIR sensor. The targeted FOV shown in FIG. 5 is broader than that shown in FIG. 6 but still more granular than that shown in FIG. 4 which has all of the sub-lenses activated.

Figure 7:
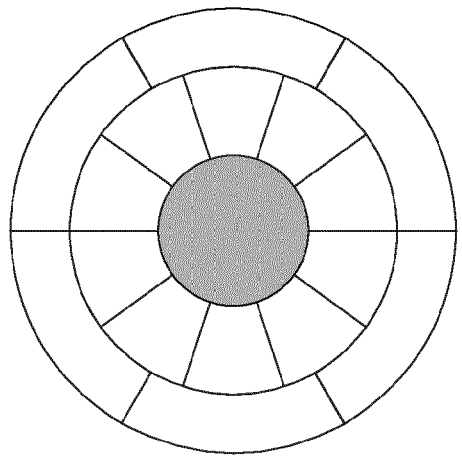
Figure 8:
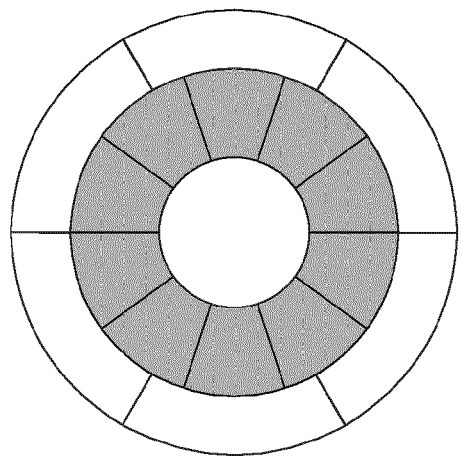
FIG. 8 shows a plurality of activatable sub-lenses of a motion sensor configured to achieve a subdivided FOV according to aspects of the present disclosure.
Figure 9:
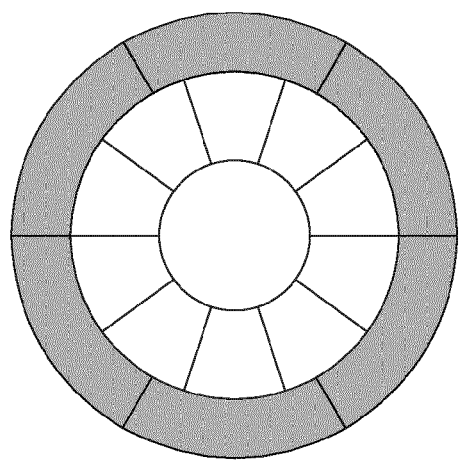
FIG. 9 shows a plurality of activatable sub-lenses of a motion sensor configured to achieve another subdivided FOV according to aspects of the present disclosure.

FIGS. 7, 8, and 9 show, respectively, an inner circle FOV, a middle ring FOV, and an outer ring FOV according to aspects of the present disclosure. The FOV in FIG. 7 is identical to the FOV in FIG. 6. FIG. 8 includes additional activated sub-lenses B, B', D1, D1', D2, D2', E1, E1', E2, and E2' when compared with the FOV in FIG. 7, but the central sub-lens A is deactivated in FIG. 8. Thus, the FOV in FIG. 8 is broader than that shown in FIGS. 6 and 7, but still more granular than that shown in FIGS. 4 and 5. In FIG. 9, the sub-lenses A, B, B', D1, D1', D2, D2', E1, E1', E2, and E2' are all deactivated while sub-lenses C, C', F1, F1', F2, and F2' are activated.

Figure 10:
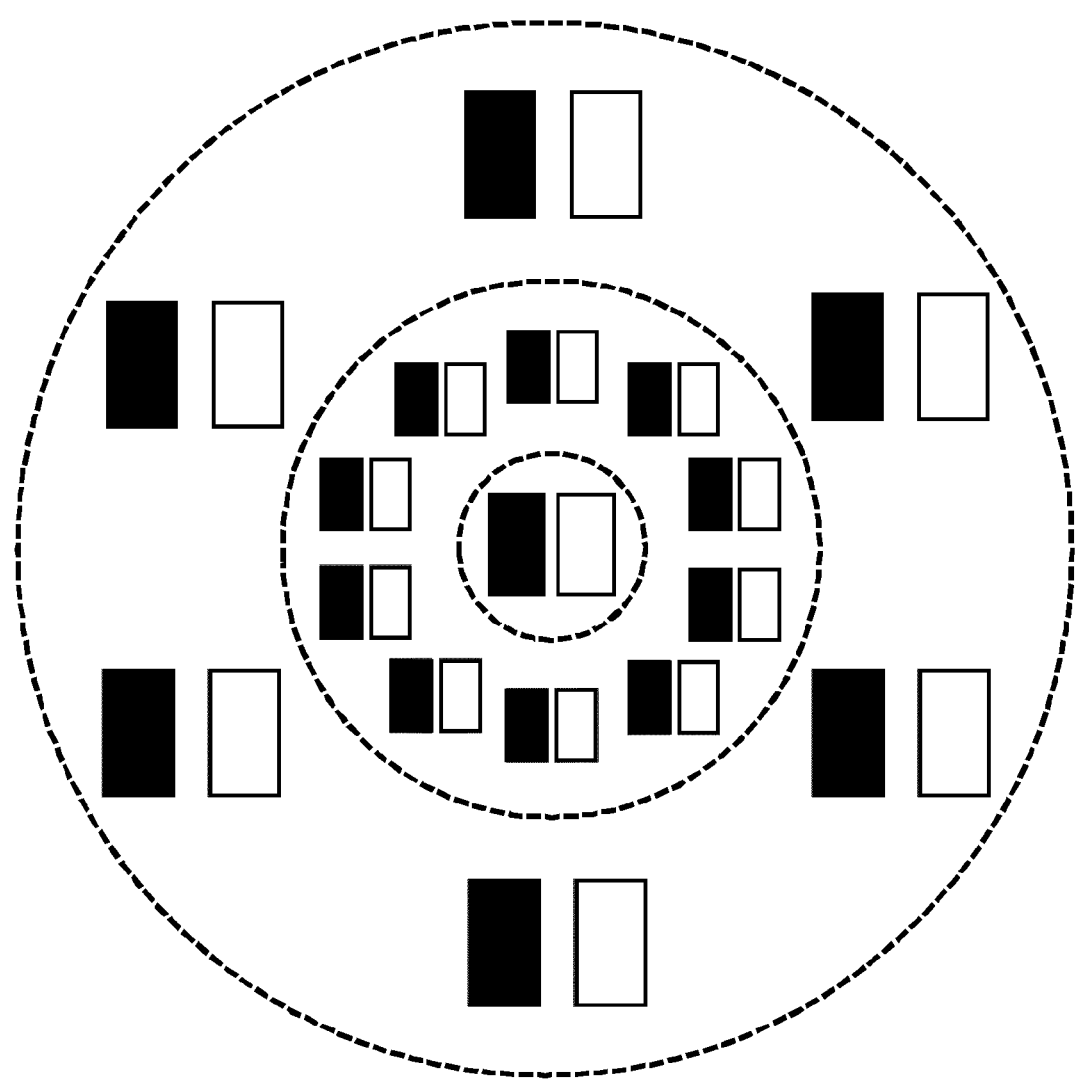
FIG. 10 shows example resulting detection areas for the wide FOV of FIG. 4 according to aspects of the present disclosure.

FIG. 10 shows the resulting detection areas of each sub-lens activated in FIG. 4 for a two element sensor. As one can appreciate in the embodiment of FIG. 10, there is a single beam of a pair of rectangular detection areas for each activated sub-lens. In other words, the detection area for each facet is a beam projection of the radiation that is focused and falls onto the two sensing elements. Movement within the detection area of a facet that creates a differential signal across the two sensing elements of sufficient amplitude will result in a motion detection. As shown in the embodiment of FIG. 10, there are six pairs of detection areas corresponding to sub-lenses C, C', F1, F1', F2, and F2', ten pairs of detection areas corresponding to sub-lenses B, B', D1, D1', D2, D2', E1, E1', E2, and E2', and a single pair of detection areas corresponding to sub-lens A. When all of these sub-lenses are activated, the FOV is equivalent to the maximum sensor coverage area or a maximum total sensor FOV.

Figure 11:
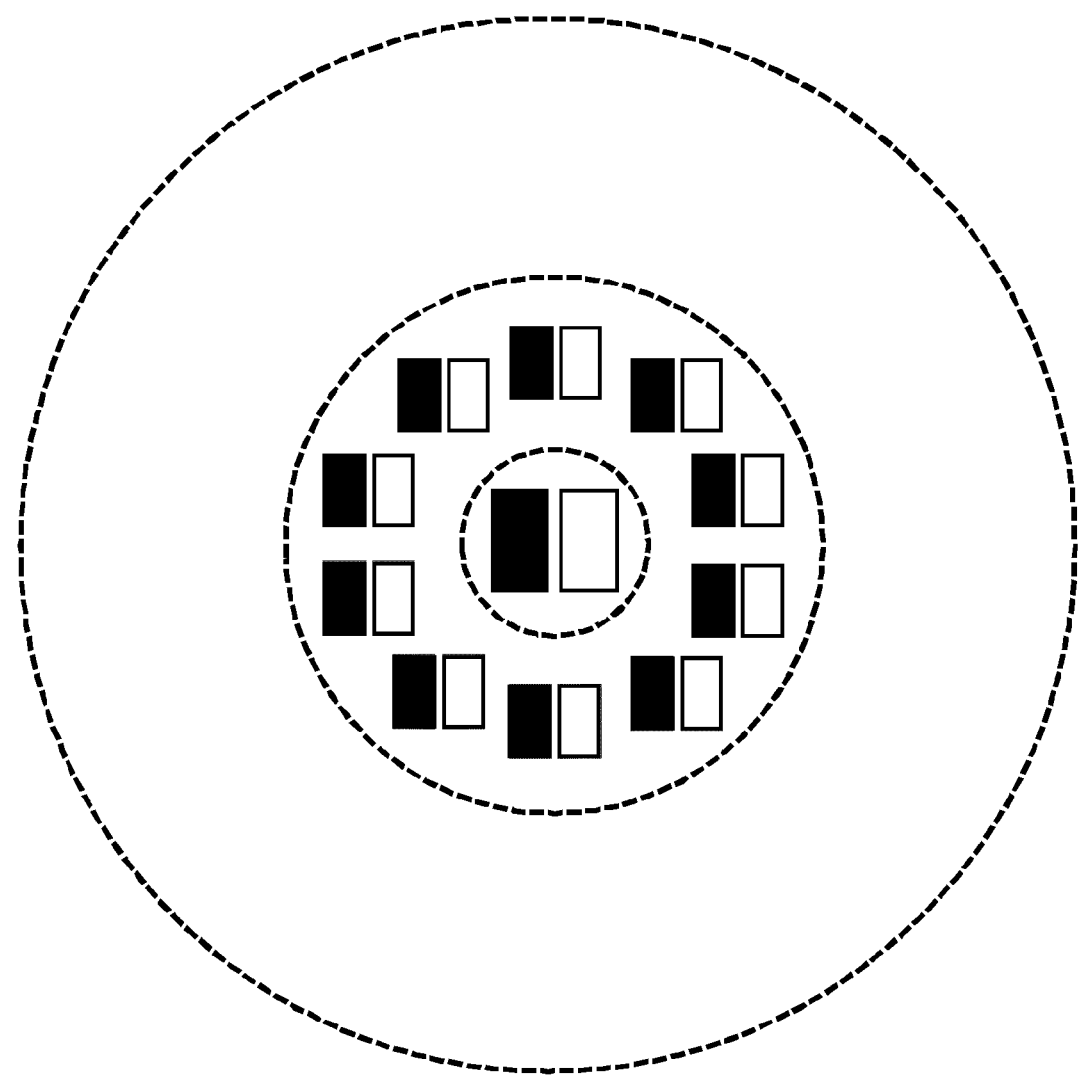
FIG. 11 shows example resulting detection areas for the medium FOV of FIG. 5 according to aspects of the present disclosure.
Figure 12:
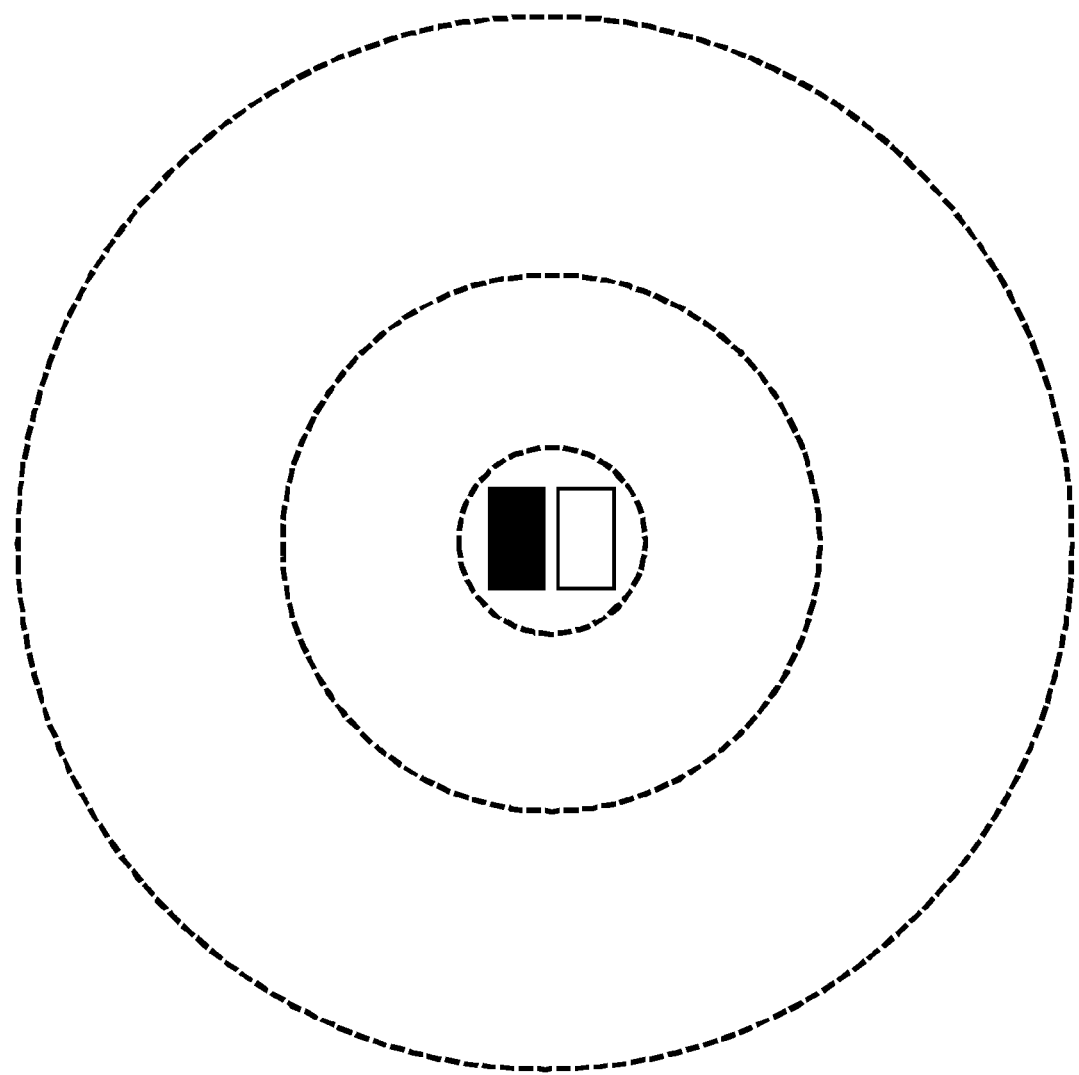
FIG. 12 shows example resulting detection areas for the narrow FOV of FIG. 6 according to aspects of the present disclosure.
Figure 13:
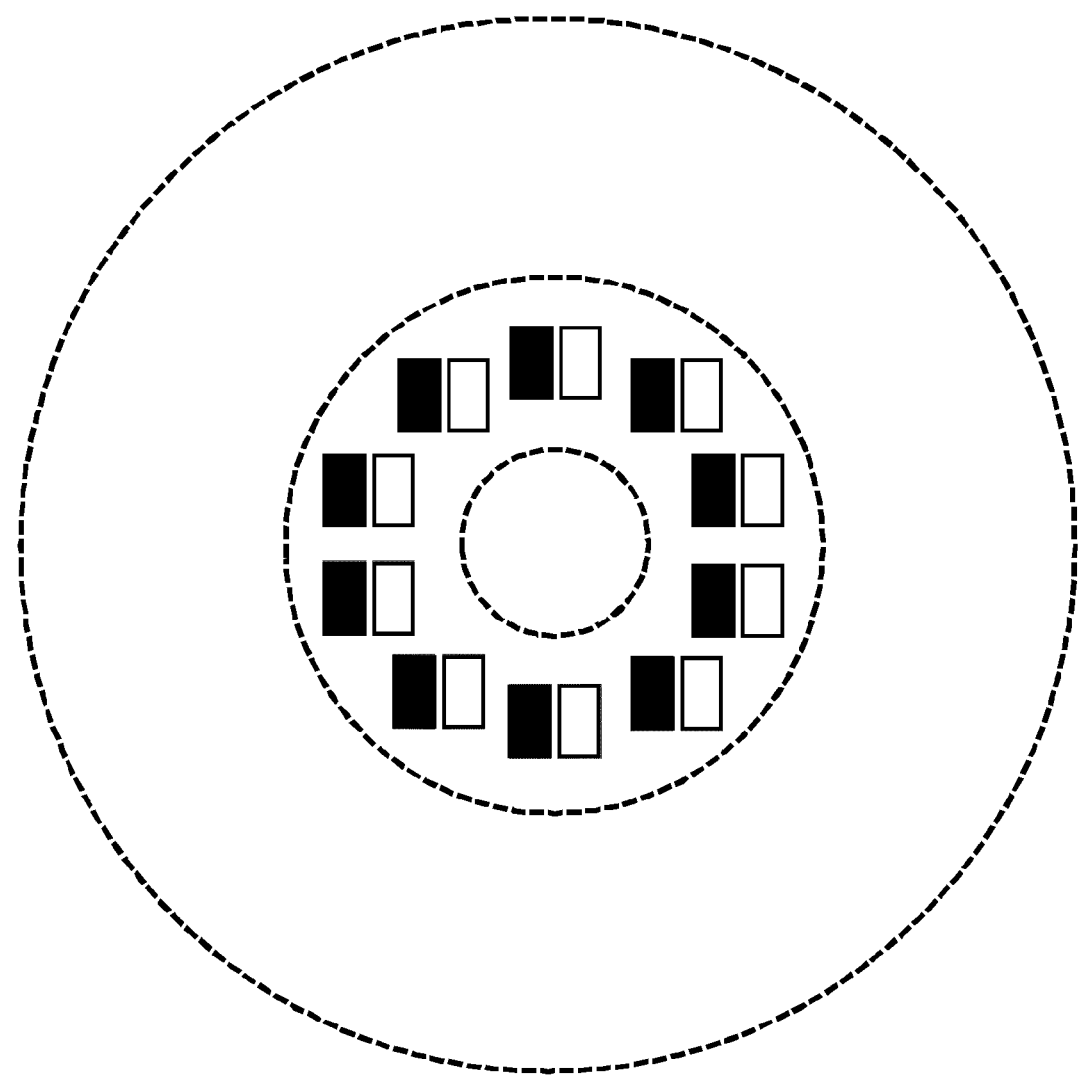
FIG. 13 shows example resulting detection areas for the subdivided FOV of FIG. 8 according to aspects of the present disclosure.
Figure 14:
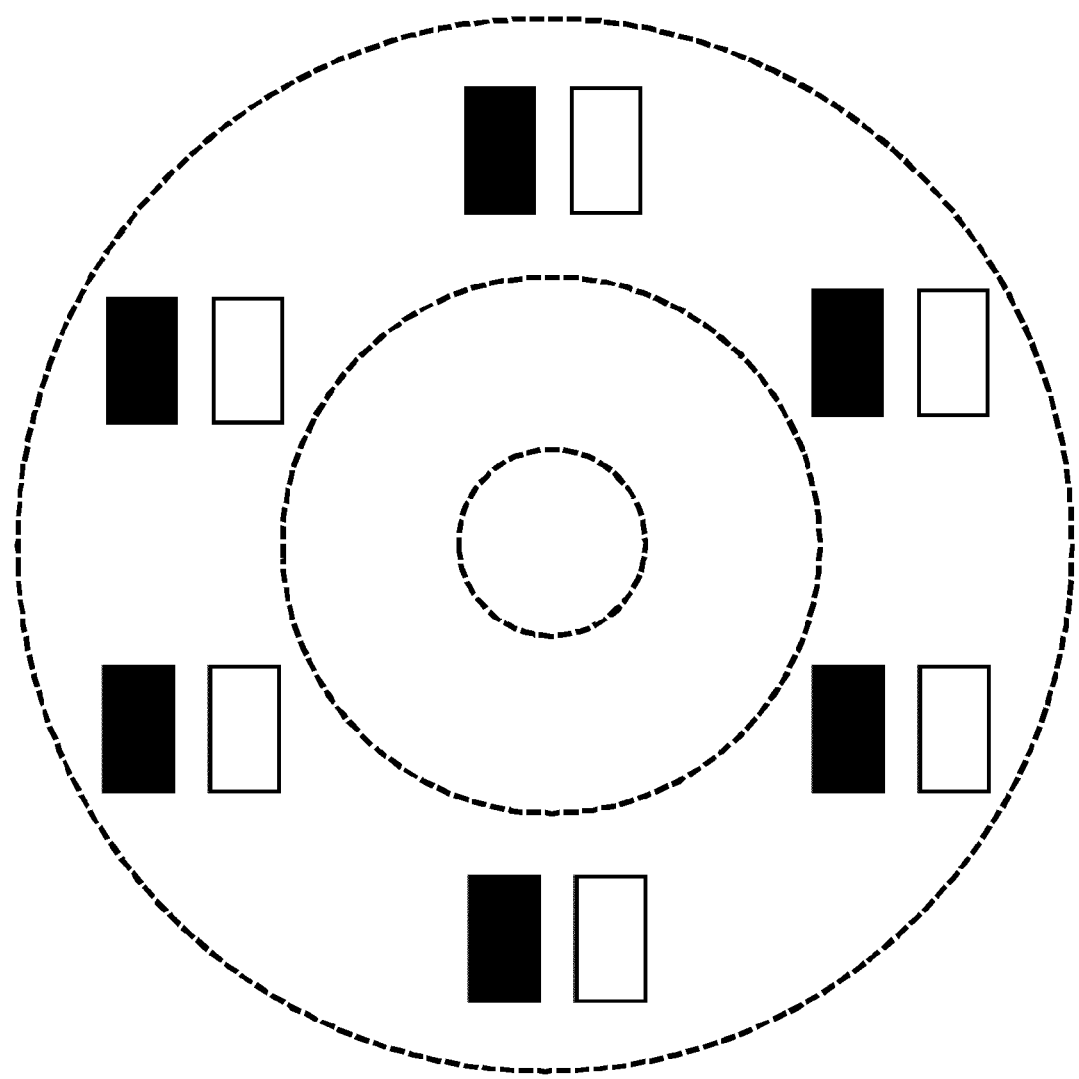
FIG. 14 shows example resulting detection areas for the subdivided FOV of FIG. 9 according to aspects of the present disclosure.

FIG. 11 shows the resulting detection areas of each sub-lens activated in FIG. 5. There are the ten pairs of detection areas corresponding to sub-lenses B, B', D1, D1', D2, D2', E1, E1', E2, and E2', and a single pair of detection areas corresponding to sub-lens A. The six pairs of detection areas corresponding to sub-lenses C, C', F1, F1', F2, and F2' are omitted in FIG. 11. FIG. 12 shows the resulting detection areas corresponding to sub-lens A. The ten pairs of detection areas corresponding to sub-lenses B, B', D1, D1', D2, D2', E1, E1', E2, and E2' shown in FIGS. 10 and 11 are omitted in FIG. 12. FIGS. 13 and 14 show alternate resulting detection areas for the activated sub-lenses shown in FIGS. 8 and 9, respectively.

As shown, any singular sub-lens or combination of sub-lenses can be activated to enable motion detection in specific areas. For example, a single activated sub-lens of an example motion sensor can be configured to achieve a subdivided FOV as shown in FIG. 15 (e.g., sub-lens F2). In FIG. 16, two activated sub-lenses of another example motion sensor can be configured to achieve another subdivided FOV as shown (e.g., sub-lenses F1 and F1'). When two motion sensors are arranged such that the total sensor FOVs of the two motion sensors 101A and 101B at least partially overlap as shown in FIG. 17, a targeted detection zone 102 can be formed by activating the sub-lenses shown in FIGS. 15 and 16. In this way, sub-lenses from multiple networked sensors can be activated to form a combined detection area using collaborative beamforming.

Figure 18:
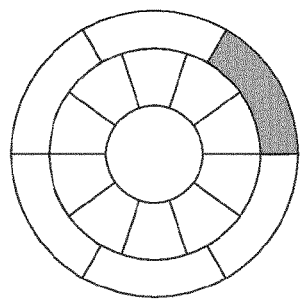
FIG. 18 shows the single activated sub-lens of the example motion sensor of FIG. 15.
Figure 19:
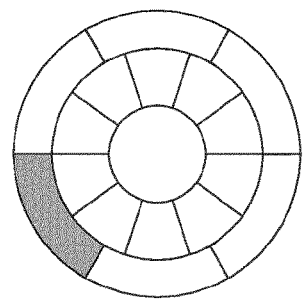
FIG. 19 shows another single activated sub-lens of an example motion sensor configured to achieve another subdivided FOV according to aspects of the present disclosure.
Figure 20:
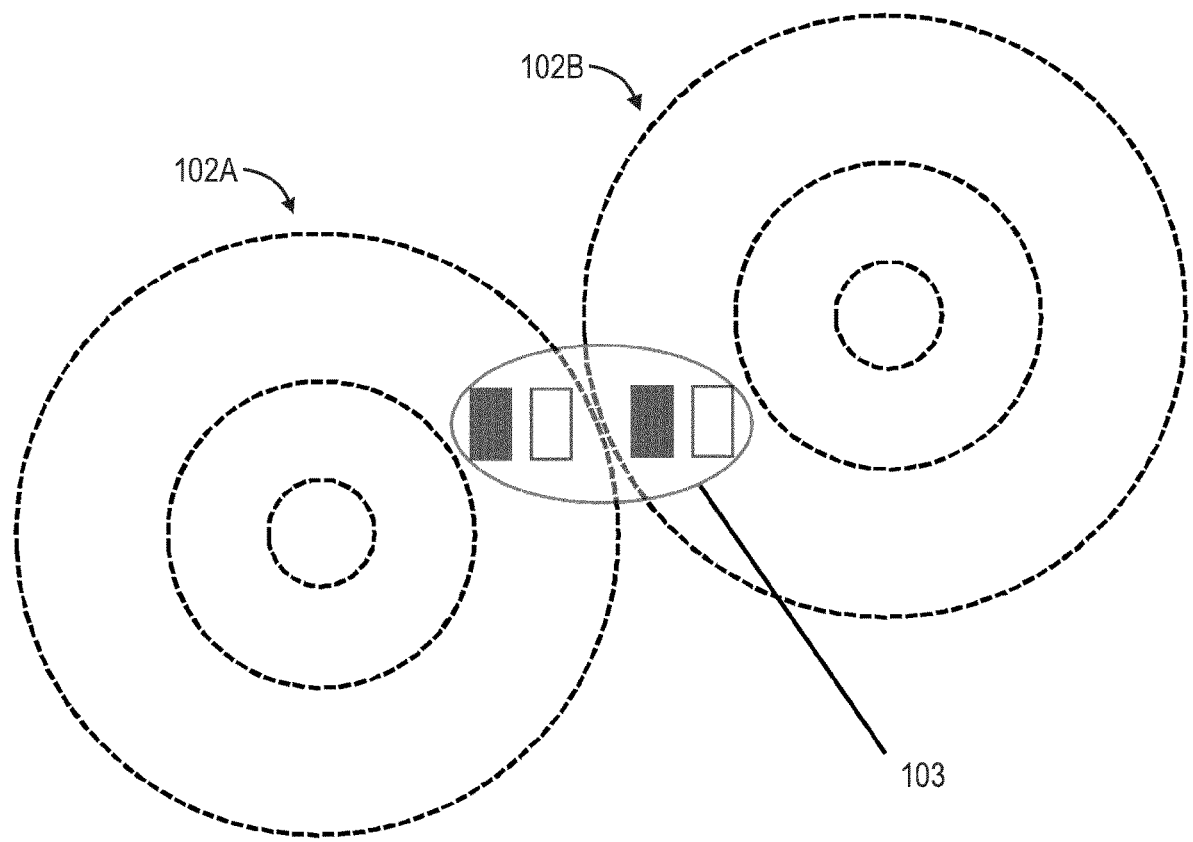
FIG. 20 shows a detection zone formed from active beams generated from the motion sensors of FIGS. 18 and 19 according to aspects of the present disclosure.

Alternatively or additionally, as shown in FIGS. 18, 19, and 20, sub-lenses from multiple networked sensors 102A and 102B can be activated to form a combined detection area even when the FOVs of the sensors do not overlap. For example, a single activated sub-lens (e.g., sub-lens F2) in sensor 102A and another single activated sub-lens (e.g., sub-lens F1') in sensor 102B can form a combined detection area using collaborative beamforming. Any number of activated sub-lenses can be combined to form detection areas using collaborative beamforming.

With different configurations of sub-lenses there can be many possible options to sub-divide the sensor detection area. Subdividing the sensor detection area enables motion detection or occupancy sensing at different spatial granularities. In other words, dynamically focusing the FOV of a PIR sensor on different positions within an area enables targeted presence/vacancy determination and people counting. The sensor information from the different positions, can reveal additional information about how many occupants are in an area and/or where they are located.

Figure 21:
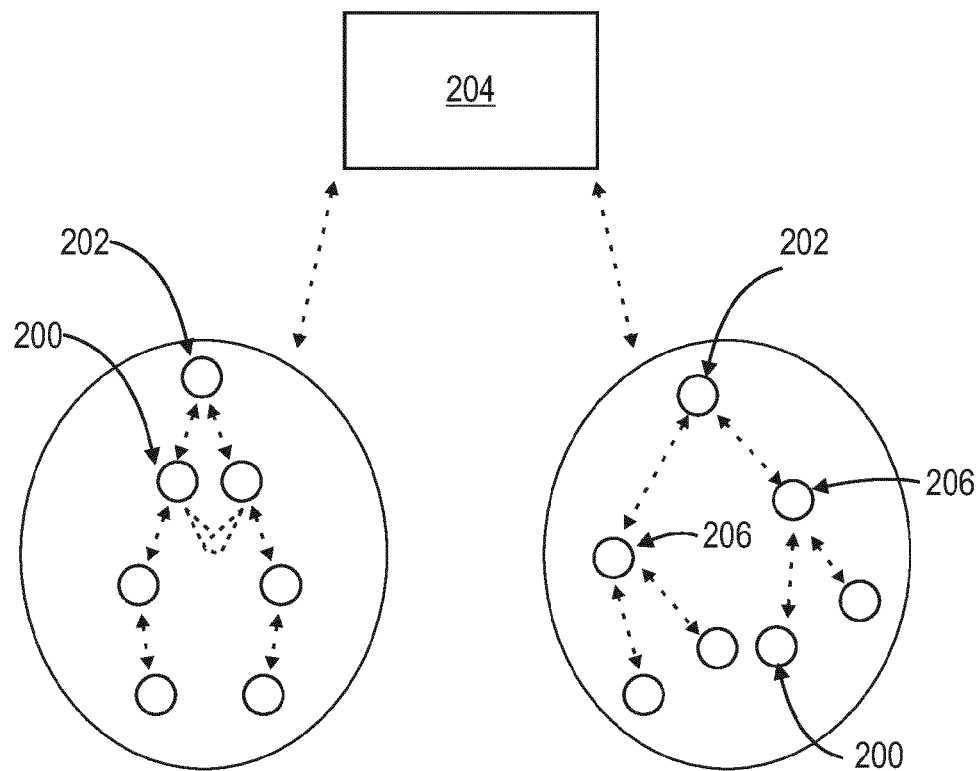
FIG. 21 shows an example of collaborative beamforming according to aspects of the present disclosure.

Embedded PIR sensors usually have overlap so they can provide seamless coverage to monitor the area. When the sensors are networked together as in a lighting internet of things (IoT) network, adjacent sensors can use collaborative beamforming to scan across the area for presence detection and people counting, reducing the inaccuracy due to overlap. FIG. 21 shows an example of the collaborative beamforming. On the left side of FIG. 21, a distributed wireless sensor network (WSN) of PIR sensors or sensor nodes 200 is shown within an enclosed area that can be sensed by the sensor nodes 200. Each sensor node 200 is configured to detect IR radiation in its total sensor FOV or within a targeted FOV as described herein. In the distributed wireless sensor network, the sensor nodes 200 are also configured to process the sensor information and transmit the sensor information directly to a manager node 202 or indirectly through other sensor nodes. Once the data is obtained at the manager node 202, the data can then be transmitted to a back-end data center 204. On the right side of FIG. 21, a hierarchical wireless sensor network of PIR sensors or sensor nodes 200 is shown within another enclosed area that can be sensed by the sensor nodes 200. Each sensor node 200 is configured to detect IR radiation in its total sensor FOV or within a targeted FOV as described herein and transmit such data to the cluster heads 206. The cluster heads 206 are configured to process the sensor information and transmit the data to the manager node 202. As in the distributed network, the manager node 202 transmits the data to the back-end data center 204.

In an area having multiple PIR sensors, the sensor positions can be obtained during a commissioning process and then their relative coverage can be determined. Once their relative coverage is determined, any overlapped areas between adjacent sensors can be determined as well. Through the coordination of a manager node 202 in a distributed WSNs or a cluster head 206 in a hierarchical network, the sensors 200 can collaborate with each other to scan across the region to count the people in the area. An example of collaborative beamforming is shown in FIG. 21 where overlapped coverage is illustrated in the distributed WSN on the left.

Figure 22:
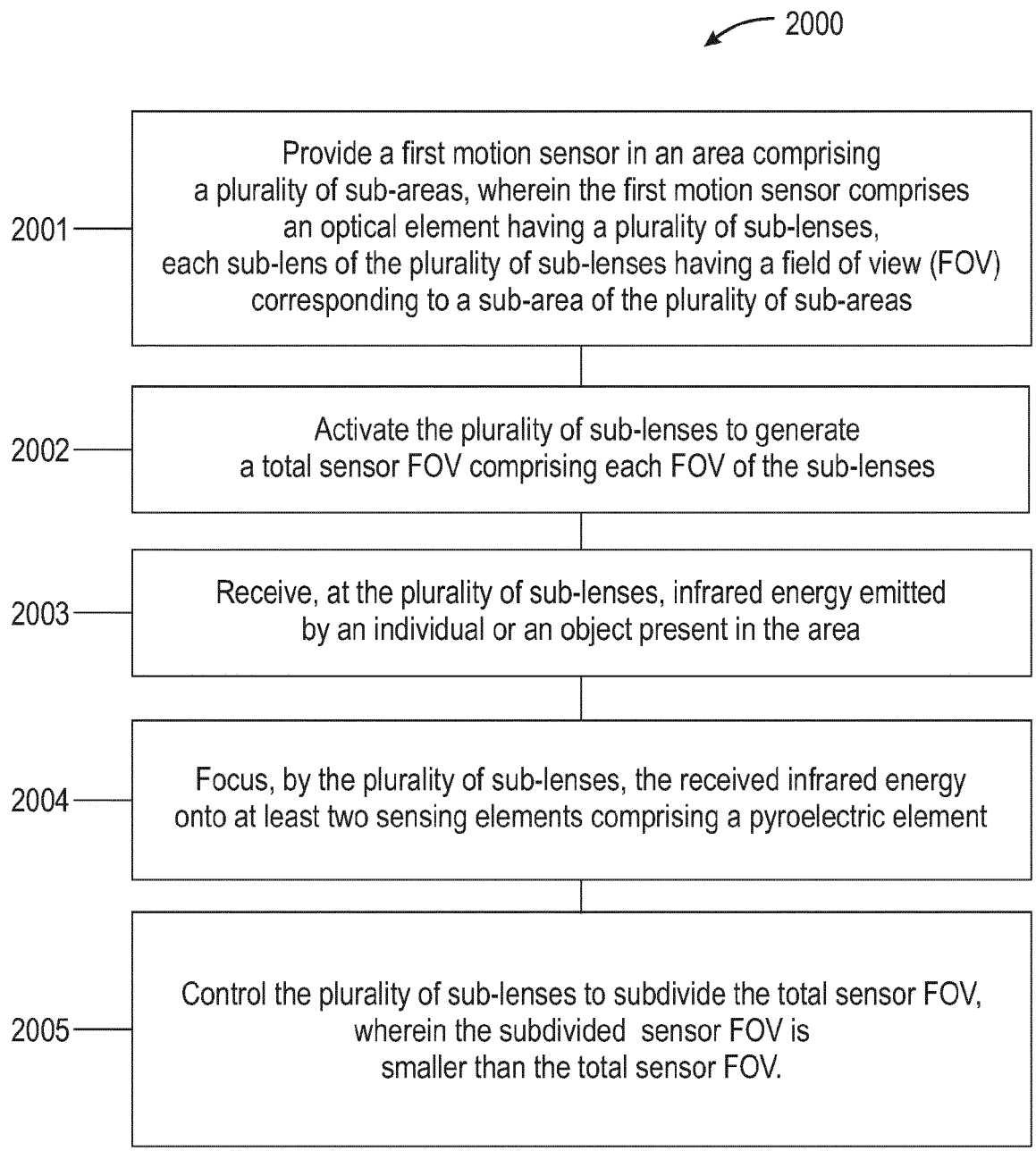
FIG. 22 describes an example detection method according to aspects of the present disclosure.

An example detection method 2000 is described as follows with reference to FIG. 22.

In step 2001, a first motion sensor is provided in an area having a plurality of sub-areas. The first motion sensor includes an optical element having a plurality of sub-lenses, each sub-lens of the plurality of sub-lenses has a field of view (FOV) corresponding to a sub-area of the plurality of sub-areas. In embodiments, the first motion sensor is a PIR sensor (e.g., sensor 12) and the optical element is a Fresnel lens (e.g., lens 12 and/or optical element 22). The plurality of sub-lenses are formed of an electrochromic photothermal material within or on the lens or optical element in embodiments. The sub-lenses can be embodied as sub-lenses 26, 28, and 30 discussed above in reference to FIG. 2 or sub-lenses A, B, B', C, C', D1, D1', D2, D2', E1, E1', E2, E2', F1, F1', F2 and F2' discussed above in reference to FIG. 3A.

In step 2002, the plurality of sub-lenses are activated by at least one processor (e.g., processor 34) to generate a total sensor FOV including each FOV of each of the sub-lenses. Using the electrochromic photothermal material, when the sub-lenses are activated, they are in a transparent state allowing IR radiation to be passed through and focused on the sensing units (e.g., sensing units 20) of the PIR sensor. Since all of the sub-lenses are activated, the total sensor FOV is equal to the maximum possible sensor coverage area. In steps 2003 and 2004, respectively, infrared energy emitted by an individual or an object in the coverage area is received at the plurality of sub-lenses and the infrared energy is focused onto at least two sensing elements including a pyroelectric element.

In step 2005, the at least one processor dynamically controls the plurality of sub-lenses to subdivide the total sensor FOV without mechanically or optically occluding the sensing elements. The subdivided sensor FOV is smaller than the total sensor FOV.

Based on the above, it should be appreciated that certain embodiments of the present disclosure provide different static FOVs enabled through remote control, for example, to fine tune sensor FOVs for commissioning purposes or in response to changing office layouts. This functionality eliminates the need to manually reconfigure or move or reinstall sensors. Additionally, certain embodiments of the present disclosure provide motion counts, or presence in various sub-areas to increase the spatial granularity of sensor information, via a single sensor, to count people more accurately or enable finer zonal control of a lighting system. Furthermore, certain embodiments of the present disclosure provide the exact positions of people or objects with collaborative beamforming which can help improve the accuracy and reduce the problem of overlapping between the sensors in a network.

It should also be understood that, unless clearly indicated to the contrary, in any methods claimed herein that include more than one step or act, the order of the steps or acts of the method is not necessarily limited to the order in which the steps or acts of the method are recited.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A detection method comprising the steps of:
    providing a first motion sensor in an area comprising a plurality of sub-areas, wherein the first motion sensor comprises an optical element having a plurality of sub-lenses, each sub-lens of the plurality of sub-lenses having a field of view (FOV) corresponding to a sub-area of the plurality of sub-areas;
    activating the plurality of sub-lenses to generate a total sensor FOV comprising each FOV of the sub-lenses;
    receiving, at the plurality of sub-lenses, infrared energy emitted by an individual or an object present in the area;
    focusing, by the plurality of sub-lenses, the received infrared energy onto at least two sensing elements comprising a pyroelectric element; and
    dynamically controlling the plurality of sub-lenses to subdivide the total sensor FOV, wherein the subdivided sensor FOV is smaller than the total sensor FOV, and wherein at least one sub-lens of the plurality of sub-lenses comprises an electrochromic photothermal material.

2. The method of claim 1, wherein the step of controlling the plurality of sub-lenses further comprises activating or deactivating at least one sub-lens to generate the subdivided sensor FOV.

3. The method of claim 1, wherein the subdivided sensor FOV is smaller than 90 degrees.

4. The method of claim 1, wherein the subdivided sensor FOV is smaller than 45 degrees.

5. The method of claim 1, further comprising the steps of:
    providing a second motion sensor in the area, wherein the second motion sensor is adjacent to the first motion sensor;
    obtaining positions of the first and second motion sensors in the area during a commissioning process; and
    determining a coverage of the first and second motion sensors.

6. The method of claim 5, further comprising the step of controlling the pluralities of sub-lenses in the first and second motion sensors such that at least one sub-lens from each of the first and second motion sensors is configured to be activated to form a combined detection area.

7. The method of claim 5, further comprising the steps of determining an overlapped area between the first and second motion sensors and controlling the pluralities of sub-lenses in the first and second motion sensors such that at least one sub-lens from each of the first and second motion sensors is configured to be activated to form a combined detection area.

8. The method of claim 1, further comprising the steps of generating sensor information indicating motion or presence in the subdivided sensor FOV and controlling a lighting system based on the generated sensor information.

9. The method of claim 1, further comprising the step of controlling the plurality of sub-lenses to further subdivide the subdivided sensor FOV, wherein the additionally subdivided sensor FOV comprises a different set of activated sub-lenses.

10. The method of claim 9, further comprising the step of generating sensor information indicating motion or presence in the subdivided sensor FOV and/or the additionally subdivided sensor FOV and time multiplexing the generated sensor information to facilitate control of a lighting system based on the generated sensor information.

11. A detection system, comprising:
a first motion sensor positioned in an area comprising a plurality of sub-areas, the first motion sensor comprising an optical device having a plurality of sub-lenses, each sub-lens of the plurality of sub-lenses having a field of view (FOV) corresponding to a sub-area of the plurality of sub-areas, wherein the plurality of sub-lenses are configured to receive infrared energy emitted by an individual or an object present in the area and focus the received infrared energy onto at least two sensing elements configured to generate a differential signal; and at least one processor coupled to the first motion sensor and configured to:
activate the plurality of sub-lenses to generate a total sensor FOV comprising each FOV of the plurality of sub-lenses; and
dynamically control the plurality of sub-lenses to subdivide the total sensor FOV, wherein the subdivided sensor FOV is smaller than the total sensor FOV, and wherein at least one sub-lens of the plurality of sub-lenses comprises an electrochromic photothermal material.

12. The detection system of claim 11, wherein the at least one processor is configured to activate or deactivate at least one sub-lens to generate the subdivided total sensor FOV.

13. The detection system of claim 11, further comprising a second motion sensor arranged in the area adjacent to the first motion sensor and wherein at least one sub-lens from each of the first and second motion sensors is configured to be activated to form a combined detection area comprising at least portions of sub-areas within the total sensor FOVs of the first and second motion sensors.

* * * * *